(12) United States Patent
Pohlen et al.

(10) Patent No.: US 12,358,265 B2
(45) Date of Patent: *Jul. 15, 2025

(54) LAMINATED GLAZING HAVING HOLOGRAPHIC FILM AND METHOD FOR PRODUCING A LAMINATED GLAZING

(71) Applicant: ACR II GLASS AMERICA INC., Nashville, TN (US)

(72) Inventors: Markus Walter Pohlen, Mückeln (DE); Steven Scott Christman, Nashville, TN (US); Emily Anne Curtis, Nashville, TN (US); Yu Matsuda, Nashville, TN (US); Michael Bard, Wadern (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 610 days.

This patent is subject to a terminal disclaimer.

(21) Appl. No.: 17/638,425

(22) PCT Filed: Aug. 27, 2020

(86) PCT No.: PCT/US2020/048148
§ 371 (c)(1),
(2) Date: Feb. 25, 2022

(87) PCT Pub. No.: WO2021/041635
PCT Pub. Date: Mar. 4, 2021

(65) Prior Publication Data
US 2022/0324205 A1 Oct. 13, 2022

Related U.S. Application Data

(60) Provisional application No. 62/894,374, filed on Aug. 30, 2019, provisional application No. 62/894,307,
(Continued)

(51) Int. Cl.
*G03H 1/20* (2006.01)
*B32B 7/023* (2019.01)
(Continued)

(52) U.S. Cl.
CPC ........ *B32B 17/10871* (2013.01); *B32B 7/023* (2019.01); *B32B 7/12* (2013.01);
(Continued)

(58) Field of Classification Search
None
See application file for complete search history.

(56) References Cited

U.S. PATENT DOCUMENTS 4,984,856 A * 1/1991 Moss .................. G03H 1/00
359/10
5,052,765 A * 10/1991 Moss .................. G03H 1/20
359/9
(Continued)

FOREIGN PATENT DOCUMENTS

CN 1675059 A 9/2005
CN 103518163 A 1/2014
(Continued)

OTHER PUBLICATIONS

Chinese Office Action and Search Report from corresponding Chinese Patent Application No. 202080060427.4, issued Feb. 2, 2023.
(Continued)

*Primary Examiner* — Martin J Angebranndt
(74) *Attorney, Agent, or Firm* — K&L Gates LLP (57) ABSTRACT

A method of preparing a glazing, comprising: stacking a first glass sheet, a first interlayer, a photopolymer film, a second interlayer, and a second glass sheet to provide a lamination stack; deairing the lamination stack; autoclaving the lamination stack to provide a laminated glazing; applying a
(Continued)

reactive light to the photopolymer film in the laminated glazing, wherein reactive light is applied to the laminated glazing through a master holographic film; and bleaching the laminated glazing such that the photopolymer film is no longer reactive to light exposure.

18 Claims, 8 Drawing Sheets

Related U.S. Application Data filed on Aug. 30, 2019, provisional application No. 62/894,441, filed on Aug. 30, 2019, provisional application No. 62/894,487, filed on Aug. 30, 2019.

(51) Int. Cl.
*B32B 7/10* (2006.01)
*B32B 7/12* (2006.01)
*B32B 17/10* (2006.01)
*B32B 37/10* (2006.01)
*G02B 27/01* (2006.01)
*G03H 1/04* (2006.01)

(52) U.S. Cl.
CPC .. *B32B 17/10128* (2013.01); *B32B 17/10449* (2013.01); *B32B 17/10889* (2013.01); *B32B 37/10* (2013.01); *G02B 27/0103* (2013.01); *G03H 1/202* (2013.01); *B32B 2250/03* (2013.01); *B32B 2307/416* (2013.01); *B32B 2307/418* (2013.01); *B32B 2307/42* (2013.01); *B32B 2307/732* (2013.01); *B32B 2309/68* (2013.01); *B32B 2310/08* (2013.01); *B32B 2457/20* (2013.01); *G02B 2027/0105* (2013.01); *G02B 2027/0194* (2013.01); *G03H 2001/043* (2013.01)

(56) References Cited

U.S. PATENT DOCUMENTS

| | | | | |
|---|---|---|---|---|
| 5,413,863 A | * | 5/1995 | Weber | G03F 7/001 430/905 |
| 5,705,298 A | * | 1/1998 | Knoedl, Jr. | G03H 1/00 430/1 |
| 5,781,317 A | * | 7/1998 | Kawazoe | G02B 27/0103 359/13 |
| 6,266,166 B1 | * | 7/2001 | Katsumata | G03H 1/0256 156/244.27 |
| 6,987,590 B2 | | 1/2006 | Phillips et al. | |
| 8,567,946 B2 | | 10/2013 | Gupta et al. | |
| 9,541,900 B2 | | 1/2017 | Bang et al. | |
| 2002/0163681 A1 | | 11/2002 | Taggi et al. | |
| 2006/0275671 A1 | | 12/2006 | Eto et al. | |
| 2014/0340723 A1 | | 11/2014 | Matsubara et al. | |
| 2017/0212289 A1 | | 7/2017 | Wiltshire et al. | |
| 2018/0113314 A1 | | 4/2018 | Holland et al. | |
| 2018/0372935 A1 | | 12/2018 | Alexander et al. | |
| 2019/0101865 A1 | | 4/2019 | Popkova et al. | |
| 2023/0244184 A1 | * | 8/2023 | Pohlen | G03H 1/02 359/3 |

FOREIGN PATENT DOCUMENTS

| | | | | |
|---|---|---|---|---|
| CN | 109581659 A | | 4/2019 | |
| EP | 2848595 A1 | | 3/2015 | |
| GB | 2260420 A | * | 4/1993 | ....... B32B 17/10036 |
| JP | 03075246 A | * | 3/1991 | |
| JP | 05024889 A | * | 2/1993 | |
| JP | H0524889 A | | 2/1993 | |
| JP | H06138807 A | | 5/1994 | |
| JP | H0798560 A | | 4/1995 | |
| JP | H0916058 A | | 1/1997 | |
| JP | 11030851 A | * | 2/1999 | |
| JP | 11249535 A | * | 9/1999 | |
| JP | 2000/276035 A | | 10/2000 | |
| JP | 2006091647 A | * | 4/2006 | |
| JP | 2007254207 A | | 10/2007 | |
| JP | 2011/232511 A | | 11/2011 | |
| JP | 2013/171098 A | | 9/2013 | |
| KR | 100291381 B1 | | 9/2001 | |
| KR | 101883235 B1 | | 7/2018 | |
| WO | 2017/106692 A1 | | 6/2017 | |
| WO | 2019/106291 A1 | | 6/2019 | |

OTHER PUBLICATIONS

Beeck et al. Holographic mirrors laminated into windshields for automotive Head-Up Display and solar protective glazing applications. SPIE vol. 1507 Holographic Optics III: Principles and Applications, pp. 394-406, 1991.

Bruder et al. Mass Production of Volume Holographic Optical Elements (vHOEs) using Bayfol® HX Photopolymer Film In a Roll-to-Roll Copy Process. Proc of SPIE vol. 10127, 101270A Practical Holography XXXI: Materials and Applications, pp. 101270A-1 to 101270A-20, 2017.

Bayfol® HX200 Description and Application Information. Bayfol® Product Datasheet edition Jul. 14, 2020, pp. 1-6, 2020.

International Search Report and Written Opinion of the International Searching Authority for PCT Application No. PCT/US20/48148, mailed on Dec. 17, 2020, by the United States Patent & Trademark Office, 20 pages.

Chinese Decision on Rejection from corresponding Chinese Patent Application No. 202080060427.4, mailed Dec. 20, 2023. 6 pages.

* cited by examiner

LAMINATED GLAZING HAVING HOLOGRAPHIC FILM AND METHOD FOR PRODUCING A LAMINATED GLAZING

CROSS REFERENCE TO RELATED APPLICATIONS

This application is a national phase application of PCT International Patent Application No. PCT/US2020/048148, filed on Aug. 27, 2020, which claims priority to U.S. Provisional Application No. 62/894,487 filed on Aug. 30, 2019, entitled "Method for Preparation of Laminated Glazing Having a Holographic Film," U.S. Provisional Application No. 62/894,441 filed on Aug. 30, 2019, entitled "Master Holographic Film Construction for Replication," U.S. Provisional Application No. 62/894,374 filed on Aug. 30, 2019, entitled "Laminated Glazing with Holographic Film," and U.S. Provisional Application No. 62/894,307 filed on Aug. 30, 2019, entitled "Method for Replication of a Holographic Film," the entire contents of which are incorporated by reference herein in their entireties.

TECHNICAL FIELDS

The present disclosure generally relates to laminated glazings having a holographic film and methods for preparing such laminated glazings.

BACKGROUND

Head-up displays (HUDs) are used in vehicles to project an image which a driver may see without looking, away from the vehicle windshield. Particularly, HUDS may typically include a projector and reflect a projected image from a windshield to provide an image for a driver. However, a windshield has two reflective surfaces in inner and outer glass surfaces which may each create a reflected image. One of the reflected images may be weaker and is known as a "ghost image" and may lead to the driver perceiving a hazy image or a double image.

Wedge-shaped interlayers have been used to align the images by adjusting the reflective point of the "ghost image" to match the reflection of the stronger image, creating a single image for the driver. However, a wedge-shaped interlayer is not adjustable and the images may be aligned only for drivers at a particular height. There is a need in the art for windshields having HUD capabilities for drivers with a range of heights.

One possible solution is to use p-polarized projector and a laminated film which reflects p-polarized light. Being near the Brewster angle, the glass surface reflections will not generate ghost images. Another possible solution is to use p- or s-polarized projector and a laminated film comprising a half wavelength retarder. Being near Brewster angle, depending on projector light polarization, only the inner or outer glass surface may reflect light. Laminating a film however may undergo the problem of wrinkles or short range deviations in the film surface which cause distortions in the HUD image.

Future HUD systems may favor larger HUD images which would need large projector apertures which are limited by available space in the vehicle dashboard. By using a holographic film which has focusing power (i.e. concave mirror feature), a smaller projector size may be used.

Some HUD constructions include holographic films which provide an image to the driver. The holographic films may be laminated to or in a glazing, as described in Manfred-Andreas Beeck et al., *Holographic mirrors laminated into windshields for automotive Head-Up Display and solar protective glazing applications*, Proc. SPIE, Vol. 1507, p. 394 (1991). However, laminating the film may cause particular difficulties, such as placement and curvature of the holographic film, as well as wrinkles and small scale deviations or unevenness in the film. There is a need in the art for a solution to at least these difficulties, among others.

One method of recording the holographic film may be commonly executed in two steps. First, a master hologram is generated by recording an interference pattern in a thin film of photosensitive polymer. Second, this master hologram is replicated in the hologram films as described in Friedrich-Karl Bruder, et at, *Mass Production of Volume Holographic Optical Elements (vHOEs) using Bayfol® HX photopolymer Film in a Roll-to-Roll Copy Process*, Proc. SPIE, Vol. 10127, p. 101270A (2017). Where these holographic films are laminated in the glazing, deviations resulting from lamination may be visible in a HUD image.

SUMMARY OF THE DISCLOSURE

Disclosed herein is a method of preparing a glazing, comprising: stacking a first glass sheet, a first interlayer, a photopolymer film, a second interlayer, and a second glass sheet to provide a lamination stack; deairing the lamination stack; autoclaving the lamination stack to provide a laminated glazing: applying a reactive light to the photopolymer film in the laminated glazing, wherein the reactive light is applied to the laminated glazing through a master holographic film and bleaching the laminated glazing such that the photopolymer film is no longer reactive to light exposure.

According to another aspect of this disclosure, a laminated glazing comprises: a first glass sheet; a first interlayer; a holographic film; a second interlayer; and a second glass sheet, wherein the holographic film provides an image which does not exhibit deviations which are present in the holographic film.

According to yet another aspect of this disclosure, a laminated glazing comprises: a first glass sheet, a first interlayer, a holographic film, a second interlayer, and a second glass sheet, wherein the second interlayer does not include light absorbing additives.

Further disclosed herein is a method of replicating a holographic film, comprising: aligning a laminated glazing with a master holographic film; applying a reactive light through the master holographic film at an angle; and bleaching the laminated glazing with a bleaching light, wherein an interface between the master holographic film and the laminated glazing is non-reflective.

According to further an aspect of this disclosure, a holographic film construction, comprises a holographic film having a substrate layer, a photopolymer layer, and a cover layer; and a support having a molded surface to which the holographic film is laminated, wherein the molded surface has at least one portion comprising a finite curvature.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Disclosed herein are exemplary aspects of a laminated glazing having a holographic film laminated therein and methods of producing such glazings, hi the following description, for purposes of explanation, specific details are set forth in order to promote a thorough understanding of one or more aspects of the disclosure. It may be evident in some or all instances, however, that many aspects described below can be practiced without adopting the specific design details described below.

A conventional laminated glazing may include a first glass sheet, an interlayer, and a second glass sheet laminated together. The glass sheets may include, without limitation, soda-lime silicate glass described by ISO 16293-1:2008. The glass sheets may be bent to a desired shape prior to lamination. Glass bending may preferably occur by heat treatment from 560° C. to 700° C. more preferably from 600° C. to 660° C. and may include bending the glass in one or more directions.

The interlayer may include a polymer adhesive material, such as polyvinyl butyral (PVD) or any other suitable laminating material, including ethylene vinyl acetate (EVA). In a typical lamination process, the interlayer may be placed between first and second glass sheets. The glass sheets and interlayer may then be deaired prior to autoclaving. The deairing process may use mechanical pressure and/or vacuums to remove air from between the glass sheets. The deairing process may include any suitable process, such as pressure applied by rollers or by placing the glass sheets and interlayer in a vacuum bag or ring and applying vacuum pressure to the bag or ring. The materials may then be autoclaved, including the application of heat and pressure to the lamination materials, to provide a laminated glazing.

Laminated glazings may further include a film laminated between the glass sheets. In particular, laminating a functional film between two glass sheets may require a second interlayer such that the film is sandwiched between two adhesive interlayers, positioned between two glass sheets. Particularly, in a HUD compatible glazing, a film, such as a holographic film, may be used with a projector to provide an image viewable for the driver. Films, including holographic films, may further be laminated for other purposes, including lighting introduction to and/or extraction from a glazing or as anisotropic transmissive elements for solar protection. Laminated glazings may be used in any suitable application, including automotive glazings, such as windshields, sunroofs, back windows, or side windows. Laminating films may result in deviations, such as unevenness or wrinkles, including small scale deviations, in the film due to a lamination process and curvature in glass sheets, such as curvature in automotive glazings.

Particularly, holographic films may be formed of photopolymer films, which may, in some instances, include a substrate layer, a photopolymer layer, and a cover layer. The substrate layer may include any suitable material such as cellulose triacetate film (TAC), polyethylene terephthalate (PET), polycarbonate (PC), polyurethane (PU), or others. Holographic films may be copied or replicated in the photopolymer layer optically with the use of an original, or master, holographic film. A typical replication process may include laminating a photopolytner film to a master holographic film and applying a light, such as a collimated line focused laser light, though the master film to the photopolymer film. The holographic films may be designed to account for the glass size and shape, including the intended position of a HUD image. However, where a holographic film is laminated in a glazing, it may not be possible to design a holographic pattern to account for changes in the film due to lamination, including deviations, which may be unpredictable.

The photopolymer may be made from any suitable material capable of recording holograms or particularly, volume holographic optical elements (VOEs), by optical polymerization of monomers and oligomers. A photopolymer may include polymerizing monomers, photopolymerization initiators, and matrix polymers. Functional (meth) acrylate, functional (meth) acrylamide, functional (meth) acrylonitrile, and functional (meth) acrylic acid may be used as polymerizing monomers. Generally known photopolymerization initiators may be used without any material limitation, and for example, monomolecular initiators bimolecular initiators may be used. Monomolecular initiators, such as triazine, benzophenone, benzoin, and benzyl ketal may be used. Matrix polymers may include, for example, polyurethanes, polyacrylates, and polymethylmethaerylates. A photopolymer used herein may include, for example, Bayfol (Registered trademark) made of Covestro LCC may be exemplified.

In addition to HUD films, holographic films may be used fur lighting, including introduction and extrusion of light from a glazing. A holographic film may have a pattern for providing a desired lighting effect. In some embodiments disclosed herein, the photopolymer film may preferably extend across a majority of the laminated glazing. Alternatively, it may be: preferable in some embodiments to minimize the material used and the photopolymer film may have an area not more than 50%, preferably 25%, or more preferably 10% of the area of the laminated glazing. Some further embodiments may include a film which has a functional photopolymer layer on only part of the film, such that the functional photopolymer layer may be in an area not more than 50%, 25% or 10% of the laminated glazing. Particularly, where the laminated glazing is used as a vehicle windshield, the photopolymer film may extend across the windshield viewing area, particularly in an area used for HUD. An edge of the photopolymer may be visible when laminated in transparent glass. Some glazings may include an obscuration in and or on the glazing which may hide the film edge, such that it may not be visible to an observer. An obscuration may include, for example, an opaque print which may be provided near an edge of the laminated glazing. Such an opaque print may include a black enamel print.

Among other aspects, the present disclosure provides a laminated glazing having a holographic film laminated therein for HUD images or other lighting effects which are not affected by deviations in the laminated film. Deviations a laminated film may interfere with the intended holographic film surface as there are local changes in the surface location of the film. Deviations may change the distance and/or angle of a projection thereon which may change the image to be seen by an observer, such as the driver, where the image may appear hazy or incomplete. The laminated holographic film with deviations may not have the same projection surface as it had as a flat or substantially flat film prior to lamination. Further, where a laminated holographic film is used as part of a lighting system, deviations in the holographic pattern may affect the lighting affect, such as a direction of the lighting.

Where a holographic pattern is replicated on a flat film prior to lamination, deviations created during lamination may interrupt the holographic pattern on the film in unpredictable and unrepeatable ways. Further, high temperature and pressure during the autoclaving process may alter Bragg grating in the hologram resulting in deviations in the designed hologram features as reflected wavelengths and angles. Thus, the pattern may not be created to account fur such unpredictable changes in the film structure. According to some embodiments disclosed herein, the holographic film may not show deviations present in the film in a projected image or light. Particularly, a laminated photopolymer film may include deviations upon which the replication. may be performed. In such an embodiment, the replicated holographic pattern may be undisturbed by the deviations. Because the deviations are created during lamination before replication, the holographic pattern may be replicated over such deviations, limiting the visibility of such structural elements in an image projected onto the film or light otherwise directed to the film.

It may be further preferable to limit the number of deviations in a laminated film to further reduce their appearance in a projected image. In some embodiments, a thin interlayer may be used in the glazing. Standard interlayers may be at least 0.75 mm in thickness. In an autoclave, process, heat and pressure are applied to the glazing, during which the interlayer softens and becomes more malleable. The film may move and become less even in such conditions as the interlayer provides flexibility between the glass substrate and the film. Reducing the thickness of an interlayer may allow the film, under pressure, to more readily form to the glass surface. In some embodiments, a first interlayer ma have a different thickness than a second interlayer where the film is laminated between the first and second interlayers. Preferably, at least one of the first and second interlayers is equal to or less than 0.5 mm, more preferably equal to or less than 0.3 mm, and even more preferably equal to or less than 0.1 mm. An adhesive interlayer may have a thickness as thin as 1 µm. The reduced interlayer thickness may decrease deviations which may be visible outside of a HUD projection as well.

Figure 2:
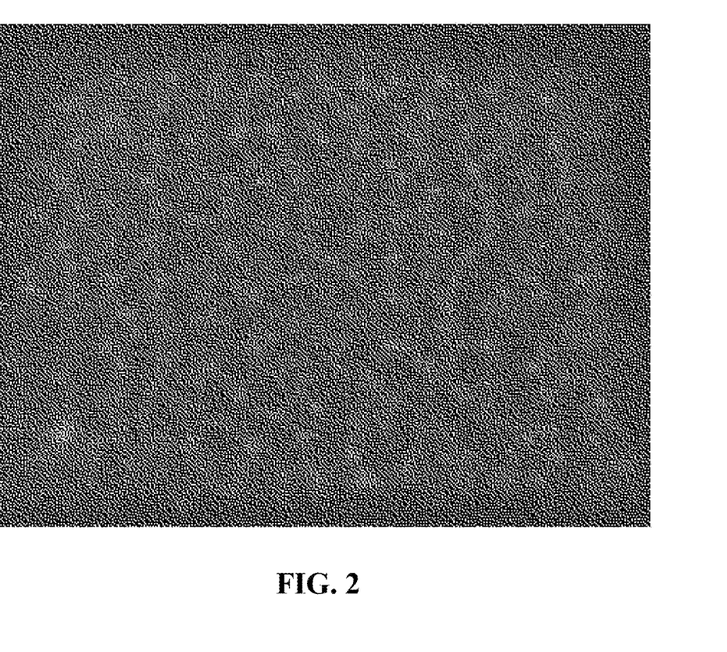
FIG. 2 illustrates deviations in a laminated glazing.

FIG. 2 shows deviations visible in light projected through a laminated glazing. Light may be scattered by deviations in the glazing, creating a visible pattern of deviations. Products described herein may be formed to provide a laminated glazing for projection of an image to provide a virtual HUD image which is not affected by such deviations.

Among other features, disclosed herein is a method of preparing such a laminated glazing having a holographic film therein. In particular embodiments, after autoclaving the laminated glazing, including a laminated photopolymer film, the photopolymer film may be treated with a light and a master holographic film to replicate the master holographic film in the photopolymer film, leaving a laminated holographic film in the glazing. The photopolymer film may be activated by a reactive light during this replication process, wherein the reactive light may be in a wavelength range at which the photopolymer film may react to the light. As used herein, the reactive light may be a particular light wavelength or include light having a range of wavelengths, including light at which the photopolymer is reactive. Particularly, during preparation, the photopolymer may not be exposed to light wavelength ranges which may activate the photopolymer prior to replication and bleaching. Bleaching may include applying a light in a bleaching light wavelength to the photopolymer film which stops further activation of the film, even where the laminated film is later exposed to light having a reactive light wavelength. The photopolymer film may further not be exposed to a bleaching light prior to replicating the laminated film.

Photopolymer films may be used which may react to any suitable wavelength. Where the photopolymer film is activated and replicated by light in a visible light range, it may be preferable that the photopolymer film is not reactive to the entire visible light range (380 nm to 780 nm) such that the photopolymer film may be handled in visible light wavelengths where the film is non-reactive. For example, a laminated glazing having a photopolymer from reactive at a light wavelength around 500 nm may be handled in visible light less than or more than the reactive light wavelength (around 500 nm). The lamination process prior to replication of the photopolymer film may prevent exposure of the film to a reacting light or bleaching light, which may include light in an ultraviolet and/or a visible light wavelength. For example, the lamination process may be conducted in the dark or under light where the photopolymer film may be non-reactive. It may be preferable to prepare a laminated glazing having a film therein without exposing the film to at least one light wavelength from 200 to 780 nm, more preferably 300 to 700 nm, and even more preferably from 380 to 680 nm.

Prior to replication, lamination may include preparing a lamination stack having a first glass sheet, a first interlayer, a photopolymer film, a second interlayer, and a second glass sheet. In some embodiments, the first and second interlayers may be a thin adhesive layer which may be formed on a glass sheet or the photopolymer film or a sheet which is placed between the photopolymer film and a glass sheet. In some embodiments, the photopolymer film may be formed with the first interlayer and/or the second interlayer laminated to the photopolymer prior stacking between the first glass sheet and the second glass sheet. The lamination stack may then be deaired. The deairing process may include any suitable steps, including passing the lamination stack through rollers to apply pressure for deairing or placing the lamination stack in a vacuum bag or ring, where a vacuum pressure may be applied to pull and/or press air from the lamination stack. The lamination stack may then be autoclaved under a suitable temperature and pressure to provide a laminated glazing. The glass sheets, interlayers, and photopolymer film may be stacked, deaired, and autoclaved without exposure to a reactive light or bleaching light, including the process steps and transfer between process steps. In particular embodiments, the materials may be stacked in a dark room, which may have no light or may be illuminated with a non-reacting light. Particularly, non-reacting light may have a wavelength such that the photopolymer film in a lamination will not be activated or bleached upon exposure to the non-reacting light.

Where deairing includes rollers, the roller step may be in the dark or under non-reacting light. Where a vacuum bag is used for deairing, the transfer of the lamination stack to the vacuum bag may be done with no light or under non-reacting light. Where the vacuum bag is opaque to reacting light, the vacuum bag may be used and transferred to the autoclave in any light conditions. It may be preferable in some embodiments to use a vacuum bag which is suitable to withstand autoclave conditions, including temperature and pressure, such that the lamination stack may not need to be removed from the vacuum bag prior to autoclaving. The transfer from an autoclave to photopolymer film replication may also be done in the dark or under non-reacting light.

The replication of the laminated photopolymer film may include application of light as a collimated line focused laser beam to the photopolymer film through a master holographic film. The laminated glazing having, a photopolymer film may be aligned with the master holographic film, such that the master holographic film is aligned at least in an area to be replicated in the photopolymer film, which may include, for example, a HUD area of a windshield. The reactive light used to replicate the holographic film may be any suitable wavelength. Preferably, the reactive light has a wavelength in a range from 200 to 780 nm, more preferably from 300 to 700 nm, and even more preferably from 380 to 680 nm. Once the replication process is complete, a bleaching light may be applied to the laminated glazing to stop any further reaction of the photopolymer film.

In some embodiments, it may be preferable that the reactive light is directed to the laminated glazing from one side, such that the light travels through a glass sheet and an interlayer before reaching the photopolymer film. In certain embodiments, it may be preferable for the reactive light to transmit light through the second glass sheet and the second interlayer prior to reaching the photopolymer film. In some embodiments, the second glass sheet may have a concave surface through which the reactive light may pass. In some embodiments including a vehicle glazing, such as a windshield, the second glass sheet with a concave surface may face a vehicle interior where the first glass sheet faces a vehicle exterior. Where the reactive light is directed to the photopolymer film through at least one interlayer, it may be preferable that the interlayer is transparent or substantially transparent to the reactive light. Typically, laminated glazings may include at least one interlayer having light absorbing additives to prevent certain light wavelengths from reaching a vehicle interior, such as ultraviolet light. In some embodiments, a photopolymer film may be reactive, for example, to an ultraviolet light, and an interlayer through which such a light is directed, may be transparent or substantially transparent to that ultraviolet light. Further, the interlayer through which the reactive light passes to reach the photopolymer may include light absorbing additives which absorb light other than that of the reactive light. The interlayer on the opposite side of the photopolymer film, such that the reactive light reaches the interlayer after the photopolymer film, may include light absorbing additives which absorb light of the reactive light. It may be preferable in certain embodiments that the photopolymer film be stable with prolonged exposure to ultraviolet light.

Figure 1:
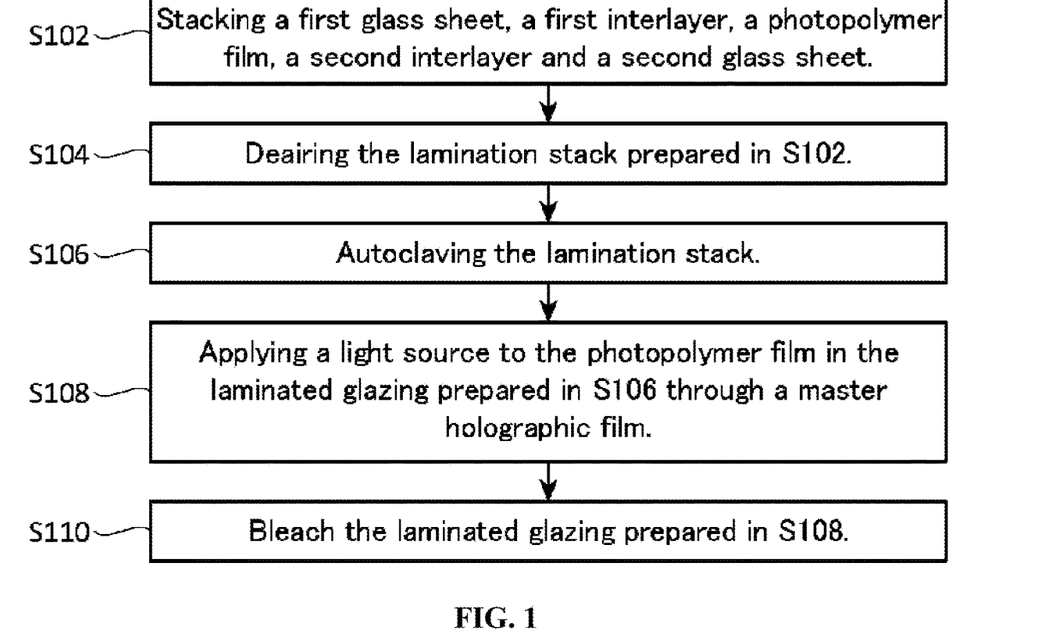
FIG. 1 shows a flowchart of a method fir forming a glazing according to an exemplary embodiment of the present disclosure.

For example, a method of providing a holographic film in a laminated glazing may include the following steps, as shown in FIG. 1. Step S102 may include stacking a first glass sheet, a first interlayer, a photopolymer film, a second interlayer, and a second glass sheet to provide a lamination stack. Step S104 may include deairing the lamination stack prepared in Step S102. Step S106 may include autoclaving the lamination stack. Step S108 may include applying a reactive light to the photopolymer film in the laminated glazing prepared in Step S106 through a master holographic film. The reactive light may have a light wavelength which may be a reactive light wavelength at which the photopolymer film may be replicated based on the master holographic film. Preferably, prior to applying the reactive light, the photopolymer film is not exposed to such a reactive light wavelength. Step S110 may include bleaching the laminated glazing prepared in Step S108. Preferably, prior to bleaching, the laminated glazing the photopolymer film is not exposed to a bleaching light wavelength.

In some embodiments, the lamination stack and/or laminated glazing may be transferred between steps in the lamination process and/or replication covered to protect from reactive light exposure. For example, a film or bag may be applied around materials when transferring the materials between steps. In further embodiments, the lamination and/or replication steps may be designed such that the transfer between steps is continuously in the dark or non-reacting light.

Further, in some embodiments, an infrared reflective layer may be included in the laminated glazing. Typically, infrared reflective layers may be used in glazings to improve thermal conditions in a vehicle. An infrared reflective layer may reflect light outside of a vehicle in at least an infrared light range and may be provided in any suitable form, such as a coating or a film. Preferably, the infrared reflective layer may be a coating on a glass sheet. It may be preferable that an infrared reflective coating on a glass sheet may be on a surface such that the coating is laminated between the glass sheets in the laminated glazing. In further embodiments, the infrared reflective layer may be a film or a coating on a film which is laminated within the glazing. In some embodiments, the infrared reflective layer may be at least partially reflective in a non-infrared light wavelength, such as an ultraviolet light wavelength range (200 to 380 nm). In various embodiments having an infrared reflective layer, the reflective layer may be on either side of the photopolymer film such that the reactive light may or may not pass through the reflective layer before reaching the photopolymer film. It may be preferable in some embodiments that an infrared reflective layer is provided with the photopolymer film between the infrared reflective layer and the reactive light source during application of the reactive light. Preferably, where the infrared reflective layer may be provided between the photopolymer film and the reactive light source, the infrared reflective layer may be substantially transparent to the light wavelength of the reactive light and the bleaching light such that the photopolymer film may be replicated.

In some embodiments of this disclosure, tinted glass may be used as a glass sheet. In certain embodiments, the tinted glass sheet may be laminated with a clear glass sheet. It may be preferable that during replication the reactive light and bleaching light may be applied to the photopolymer film between the glass sheets through the clear glass sheet opposite the tinted glass. A tinted glass sheet may have lower visible light transmission than a clear glass sheet. The tinted glass sheet may be formed of glass having a pale green, green, deep green, or grey color by addition of and/or controlling the oxidation-reduction (redox) state of iron (Fe) ions or other ion content, including transition metal ions and rare earth ions. After passing through the laminated photopolymer film, the reactive light may be absorbed or substantially absorbed by the tinted glass sheet and may not be reflected back to the photopolymer film from an outer tinted glass sheet surface, which may prevent optical noise during the replication process from reflections off the glass surface opposite the reactive light.

Determining a suitable light transmission of the tinted anchor clear glass to a wavelength of the reactive light may depend on sensitivity of photopolymer film to the wavelength of the reactive light and/or laser beam intensity of the reactive light, etc. The glass composition and thickness may contribute to the transparency, or light transmission, of the glass sheet. For a soda-lime silicate glass, which may be described in ISO 16293-1:2008, or other oxide glasses, such as alumino silicate glasses or non-alkali silicate glasses, transparency (or absorption) to a specific wavelength may depend on a content of an ion(s) including transition metal ions and rare earth ions in the glass. For example, an iron (III) ion (ferric ion) may have ionic absorption bands near 385, 420, and 435 nm and a charge transfer abortion band near 225 nm, although the wavelength of absorption bands may depend on glass composition. Further, an iron (II) ion (ferrous ion) may have a relatively broad ionic absorption band near 1050 nm and a charge transfer band near 200 nm. For other ions, broad absorption bands may be in a range of 400 to 550 nm for a manganese (III) ion, 550 to 750 nm for a Chromium (III) or (VI) ion, and 500 to 700 nm for a Cupper (II) ion. Nickel and titanium may also have an absorption band(s).

Among colorant ions, control of iron ion content may be preferable since iron ion generally relates to broad absorption which extends to a range of an ultraviolet and infrared wavelengths. Where a glazing is used in a vehicle, the increased absorption may improve comfort in the vehicle in addition to product features described herein. Total visible light transmittance $T_{vis}$, which may be a good indicator of transmittance across the visible light spectra, may be affected by at least a total iron oxide content (represented as t-$Fe_2O_3$) which includes $Fe^{2+}$ and $Fe^{3+}$, and iron (III) oxide (represented as $Fe_2O_3$). t-$Fe_2O_3$ together with $Fe_2O_3$ may give information on a redox state (i.e. $Fe^{2+}/Fe^{3+}$). The total visible light transmittance may be determined according to Japanese Industrial Standard HS R3212: 2015, "Test methods of safety glazing materials for road vehicles". To measure light transmission across a wavelength spectrum or at a particular wavelength, any suitable equipment complying with the ES R3212 may be used, such as a UV-Vis Sepectrophotometer (e.g., U4000, Hitachi High-Tech Science). t-$Fe_2O_3$ (wt %) and $Fe_2O_3$ (wt %) may be determined using any suitable measurement method including X-Ray Fluorescence (XRF) or chemical titration. In some embodiments, an example clear glass may be a soda-lime silicate glass sheet which may have $T_{vis}$ equal to or more than 91.5% (when the glass is measured with a thickness of 2.1 mm), t-$Fe_2O_3$ equal to or less than 0.020 wt %, and $Fe_2O_3$ equal to or less than 0.015 wt %. In some embodiments, an example clear glass may be a soda-lime silicate glass sheet which may have $T_{vis}$ in a range of 85.0 to 91.0% (when it is measured with a thickness of 2.1 mm), t-$Fe_2O_3$ in a range of 0.040 to 0.12 wt %, and $Fe_2O_3$ in a range of 0.020 to 0.080 wt %. In some embodiments, an example tinted glass may be a soda-lime silicate glass sheet which may have $T_{vis}$ in a range of 77.0 to 86.0% (when it is measured with a thickness of 2.1 mm), t-$Fe_2O_3$ in a range of 0.50 to 1.00 wt %, and $Fe_2O_3$ in a range of 0.30 to 0.75 wt %. In some further embodiments, an example tinted glass may be a soda-lime silicate glass sheet which may have $T_{vis}$ equal to or less than 50% (when it is measured with a thickness of 2.1 mm). t-$Fe_2O_3$ in a range of 1.20 to 1.80 wt %, and $Fe_2O_3$ in a range of 0.90 to 1.50 wt %.

If the reactive light is applied to the photopolymer film through an infrared reflective layer, the reactive light may preferably pass through the second glass sheet and the second interlayer wherein the second glass sheet has a convex surface. It may be preferable that a glass sheet between the infrared reflective layer and an exterior is a clear glass sheet to increase effectiveness of the infrared reflective layer over a tinted glass sheet. Thus, where a reactive light is applied to the photopolymer film through the infrared reflective layer, an example laminated glass construction may include, in order, a clear glass sheet, an infrared reflective layer, a photopolymer film, and a tinted glass sheet, where a reactive light is applied to the photopolymer film through the clear glass sheet and the infrared reflective layer. Some alternative embodiments may include first and second glass sheets that are both clear. Interlayers may be further used within the construction to ensure adhesion of the materials in the laminated glazing.

Figure 3:
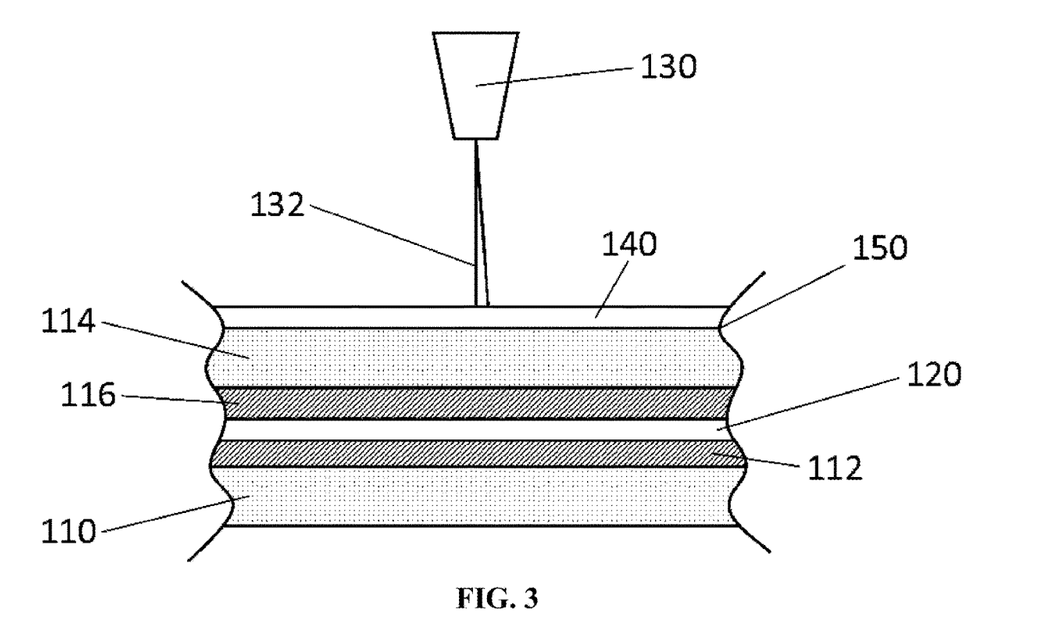
FIG. 3 illustrates a cross section of a laminated glazing with a laminated film during a replication process, according to an exemplary embodiment of the present disclosure.
Figure 4:
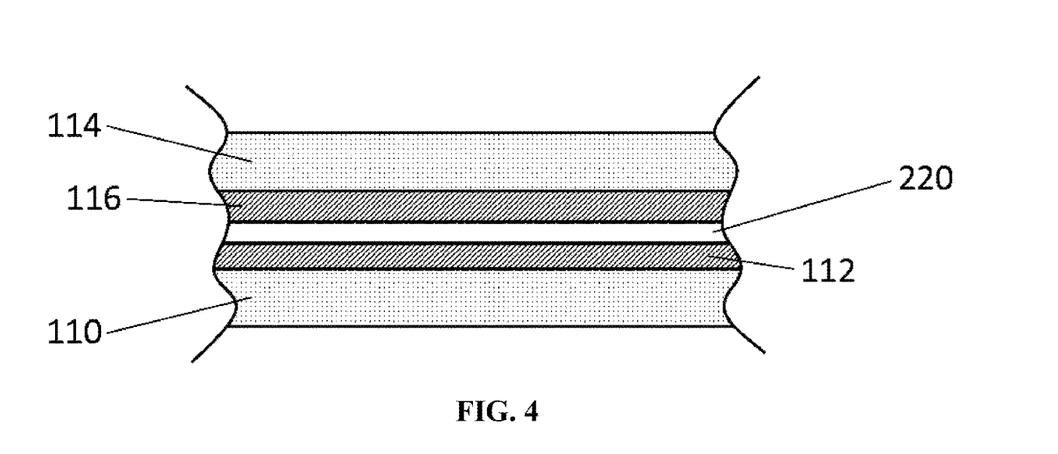
FIG. 4 illustrates a cross section of a laminated glazing having a holographic film laminated therein, according to an exemplary embodiment of the present disclosure.
Figure 5:
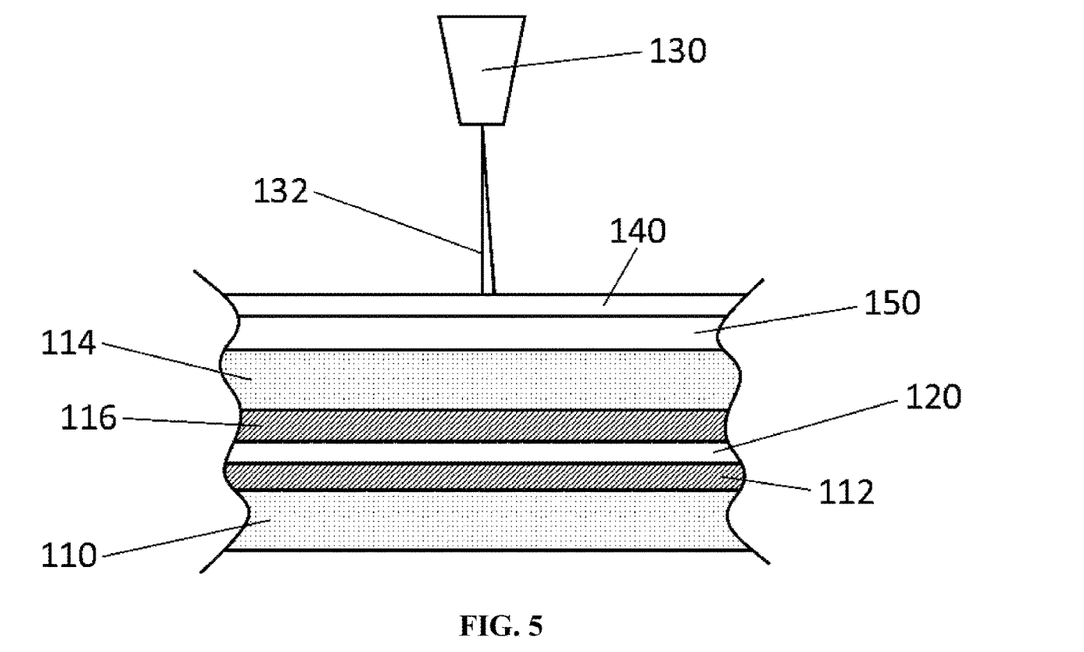
FIG. 5 illustrates a cross section of a laminated glazing with a laminated film during a replication process, according to an exemplary embodiment of the present disclosure.

As shown in FIG. 3, a laminated glazing prior to replication may include first and second glass sheets 110, 114; first and second interlayers 112, 116; and a photopolymer film 120 laminated between the first and second interlayers 112, 116. The photopolymer film 120 may be replicated using a light source 130 to project a reactive light 132 through a master holographic film 140 before reaching the photopolymer film 120. The replication process may provide a laminated glazing as shown in FIG. 4, having a laminated holographic film 220. The photopolymer film 120 may be reactive to the light 132 and form a holographic film 220 based on the master holographic film 140. An interface 150 between the laminated glazing and the master holographic film 140 is also shown in FIG. 2. The master holographic film 140 may have the same or substantially the same shape as the laminated glazing. The photopolymer film 120 may include deviations formed before or during lamination which may provide an unevenness in the film surface. Once the master holographic film 140 is aligned with the laminated glazing, the reactive light 132 may be applied to the photopolymer film 120 in the laminated glazing through the master holographic film 140. The holographic film 220 may include a pattern formed over any deviations in the film, such that the deviations may not be visible when light is projected to the holographic film 220.

Figure 7:
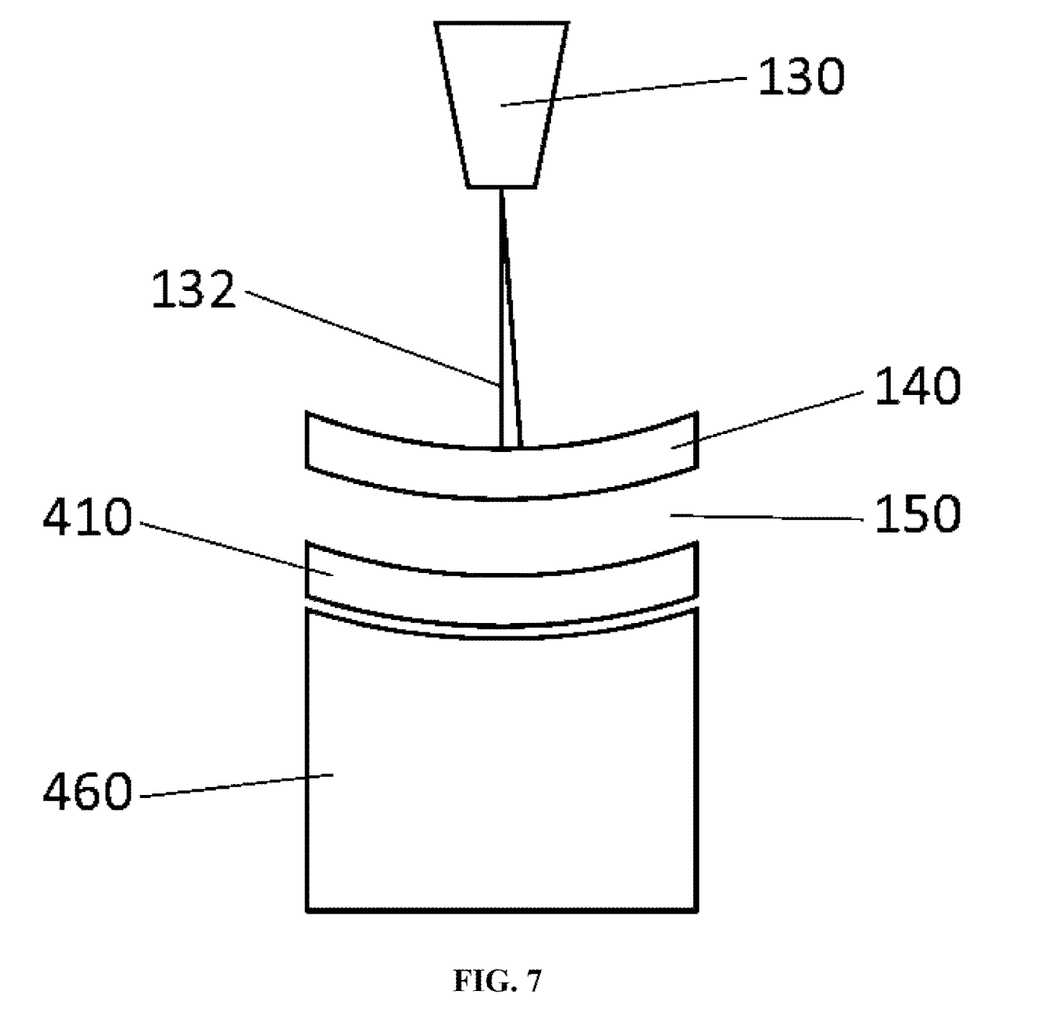
FIG. 7 illustrates a laminated glazing during a replication process, according to an exemplary embodiment of the present disclosure.

The replication process may be sensitive to vibrations or other interruptions in light application. In some embodiments, it may be preferable for the laminated glazing 410 to be placed on a mold 460 during replication, as shown in FIG. 7. The laminated glazing 410 may be any suitable shape, including bends in one or more directions, and the mold 460 may be formed based on the glazing surface shape opposite a replication surface. The replication surface may include the surface of the laminated glazing 410 through which the reactive light 132 will be applied to a photopolymer film 120 in the glazing 410. In certain embodiments, the replication surface may have a concave surface opposite a convex surface. Where the glazing surface opposite the replication surface is a convex shape, for example, the mold 460 may be a female mold to receive the laminated glazing 410. The mold 460 may be formed of any suitable material, such as concrete or steel.

In some embodiments the master holographic film 140 may remain stationary or move relative to the laminated glazing 410 to align the laminated glazing 410 with the master holographic film 140. The master holographic film 140 may be at least aligned in the area of a desired laminated holographic film 220. Where the glazing 410 is a windshield to be used for HUD applications, the master holographic film 140 may be formed to fit a HUD region of the laminated glazing 410. Particularly, a HUD region may include an area of the windshield in front of a driver when installed in a vehicle. In some embodiments, the master holographic film 140 may be larger than the HUD region of the laminated glazing 410 and may be substantially the same size as the laminated glazing 410. The master holographic film 140 may be aligned with the laminated glazing 410 with a space between the film 140 and glazing 410, as shown in FIGS. 5 to 9. The master holographic film 140 and the laminated glazing 410 may be placed adjacent to each other such that the distance between the master holographic film 140 and the laminated glazing 410 has a minimum and a maximum. The difference between the maximum distance and the minimum distance may preferably be 6.0 mm or less, more preferably 3.0 mm or less, and even more preferably 2.0 mm or less. Further, the distance between the master holographic film 140 and the laminated glazing 410 in a head-up display region of the laminated glazing may have a rate of change of 1.0 mm or less over 100 mm. It may be preferable that the master holographic film 140 has a shape the same or substantially the same as the replication surface of the laminated glazing 410.

Preferably, the interface 150 between the master holographic film 140 and the laminated glazing 410 may be non-reflective such that the reactive light 132 may not reflect between the laminated glazing 410 and the master holographic film 140. In at least some parts of the interface 150, there may be space between the laminated glazing 410 and the master holographic film 140. It may be preferable to apply a vacuum pressure to the space, in part to decrease the space between the laminated glazing 410 and the master film 140 and to fix the relationship between the glazing 410 and the film 140. In some embodiments, the space at the interface 150 may be filled with a filling material. The filling material may be formable such that it may take the shape of a space between the laminated glazing 410 and the master holographic film 140. Preferably, the filling material has an index of refraction that is the same or substantially the same as the index of refraction of the laminated glazing 410 glass sheet which includes the replication surface, which may be the second glass sheet 114. The filling material may, for example, include an oil or a gel. In some embodiments, the filling material may be provided in a casing, wherein the casing has an index of refraction the same or substantially the same as the index of refraction of the filling material. The filling material may further be provided as a soft sheet material which may be embossed. Pressure may be used to press the filling material between the glazing 410 and the master film 140. Where the filling material is a sheet material, embossing may allow for air to escape from around the filling material under pressure, which may prevent air bubbles which may affect replication from being trapped between the sheet material and the laminated glazing 410 or master holographic film 140. The filling material may not adhere to the film 140 or the glazing 410, such that the master film 140 and the laminated glazing 410 may be separated after replication.

Figure 6:
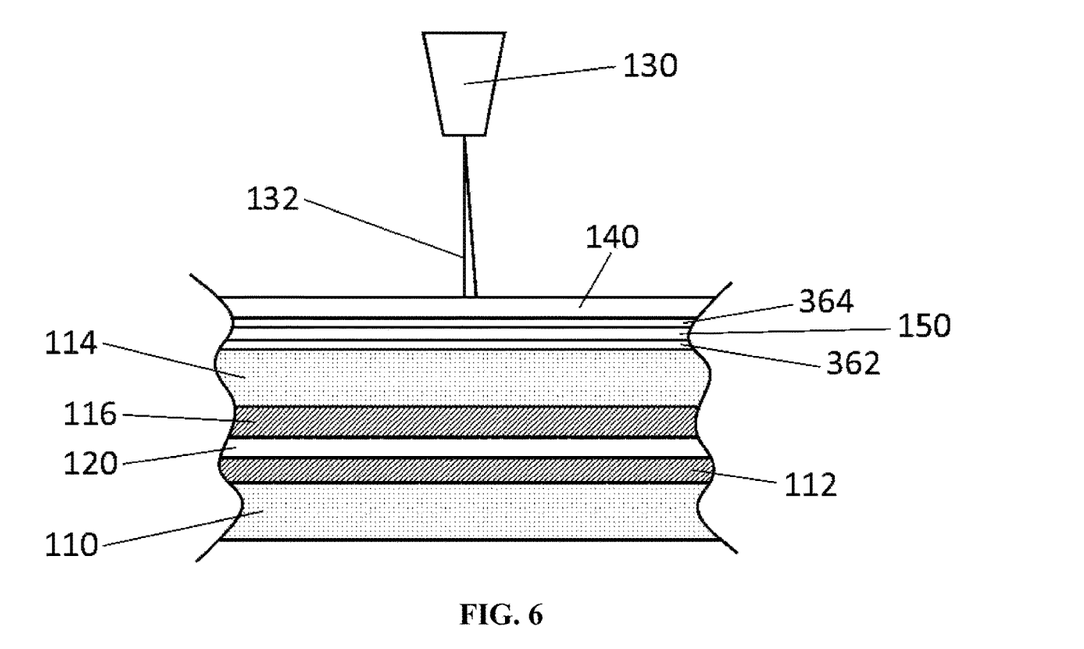
FIG. 6 illustrates a laminated glazing with a laminated film during a replication process, according to an exemplary embodiment of the present disclosure.

In certain further embodiments, as shown in FIG. 6, the master holographic film 140 and the laminated glazing 410 may include antireflective layers 362, 364 at the interface between the master film 140 and laminated glazing 410, such that the antireflective layers 362, 364 may face each other at the interface 150. Preferably, the antireflective coatings 362, 364 remain intact at least through the replication process. In some embodiments, the antireflective coatings 362, 364 may be most effective where the light 132 is applied at a 90° angle relative to a surface. Preferably, in some embodiments, the reactive light 132 applied to the photopolymer film 120 may be provided at an angle of 70° to 110° with respect to the laminated glazing surface, more preferably 80° to 100°. The reactive light 132 may be provided such that it is directed to the photopolymer film 120 at a particular angle. Preferably, the angle of the light may be from 80° to 100°.

Further, the angle of the light 132 may be consistent when applied to the photopolymer film 120. As the laminated glazing 410 may include a curved film 120, such as a film 120 laminated in an automotive glazing, which may have bent glass sheets 110, 114 having a curved surface, in some embodiments, the light 132 may be provided by a light source 130 which moves according to the curvature in the photopolymer film 120. Preferably, the photopolymer film 120 curvature is substantially the same as the glazing 410 curvature, such that the light source 130 may move in a path which complements the shape of the laminated glazing 410 as well as the photopolymer film 120.

Figure 8:
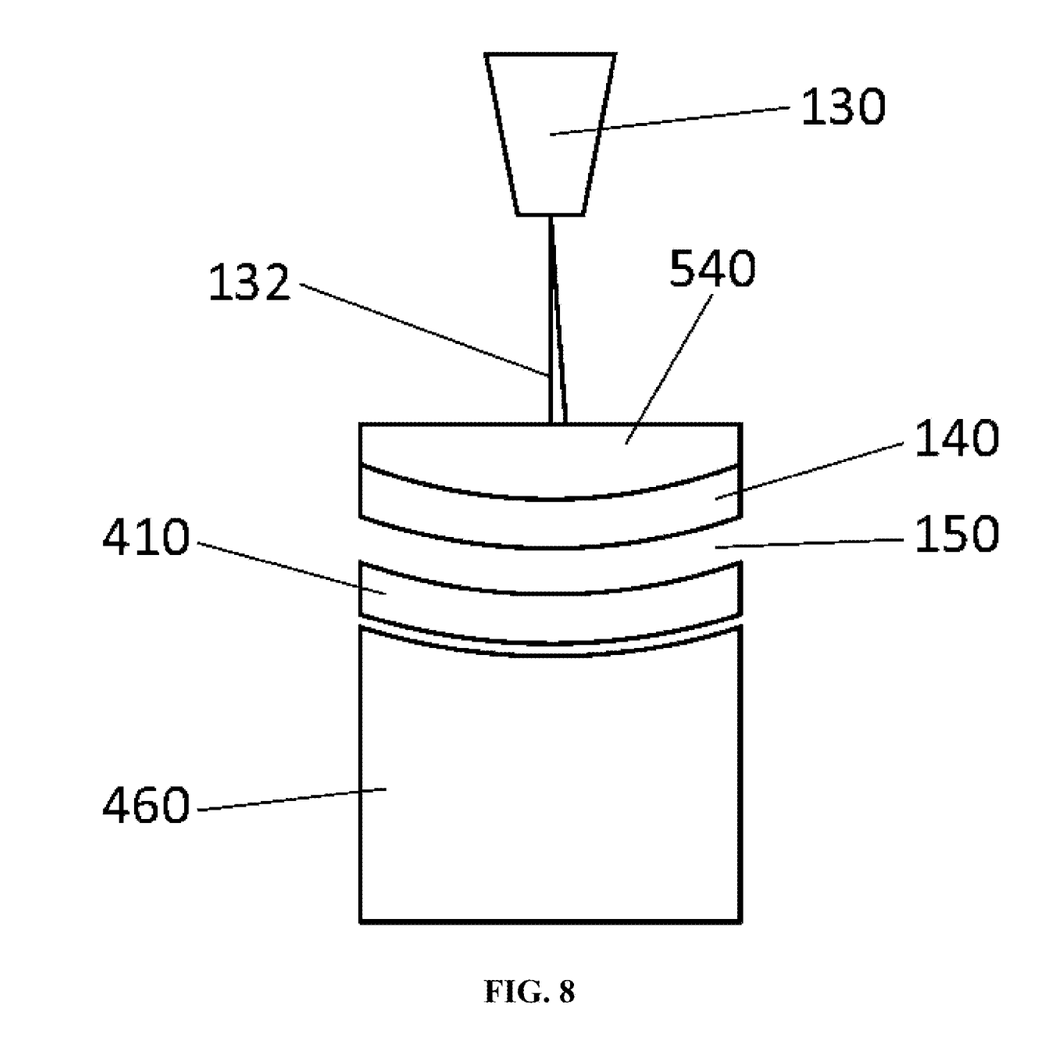
FIG. 8 illustrates a laminated glazing during a replication process, according to an exemplary embodiment of the present disclosure.
Figure 9:
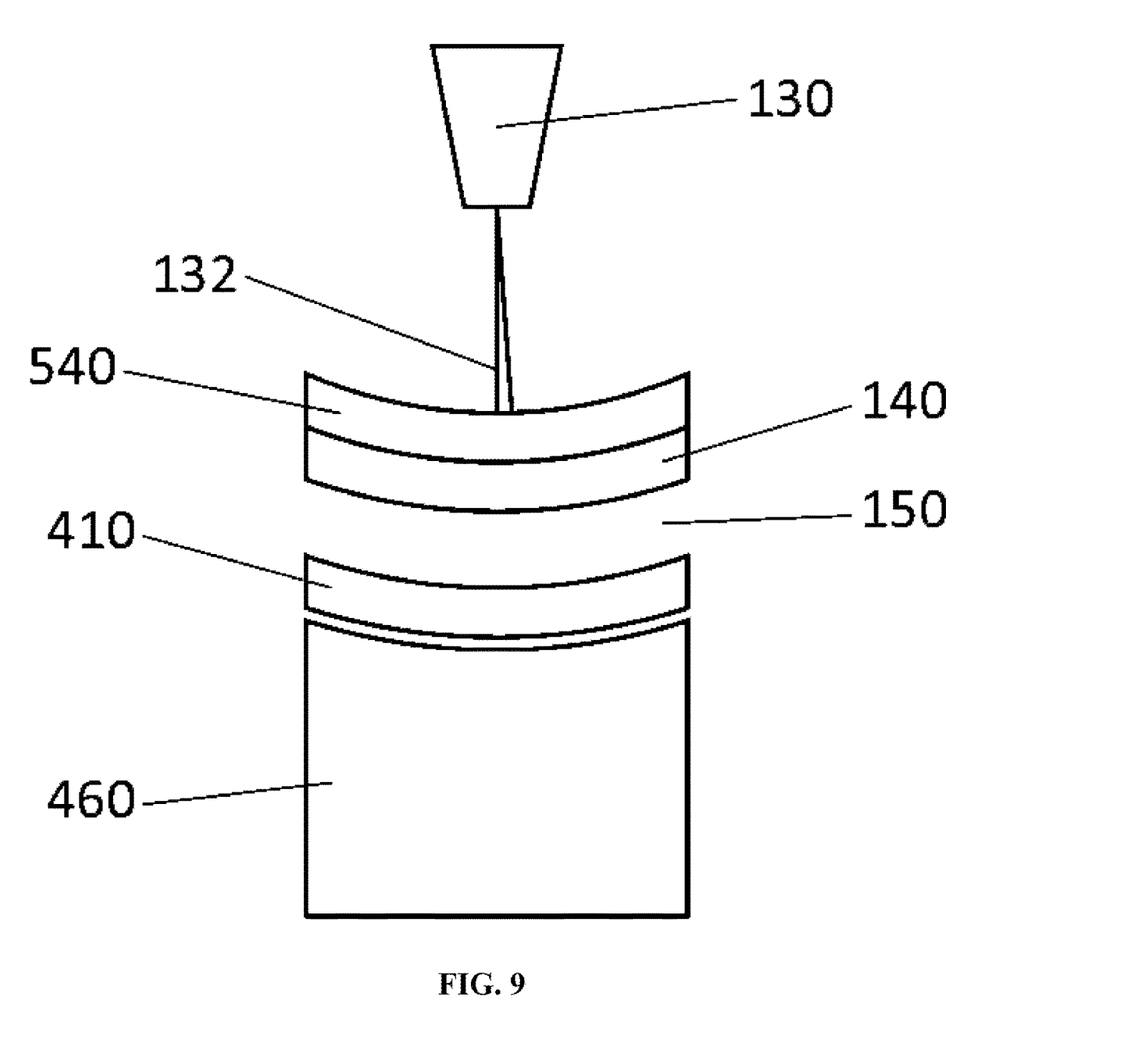
FIG. 9 illustrates a laminated glazing during a replication process, according to an exemplary embodiment of the present disclosure.

The replication process may be particularly sensitive to vibrations which may result in position changes of the master holographic film 140 with respect to the photopolymer film 120 to be illuminated. It may be preferable to provide the master holographic film 140 on a master film support 540 which may limit vibrational effects on the master film 140, as shown in FIGS. 8 and 9. The master film 140 may be laminated to the master film support 540. The master film support 540 may be any suitable material, such as glass or a polymer material. Preferably, the material used for the master film support 540 may have an index of refraction matching an index of refraction of a glass sheet 114 of the laminated glazing 410. The master film support 540 may have an index of refraction in a range of 1.44 to 1.60, preferably from 1.48 to 1.56 when measured at a wavelength of 600 nm. The master film support 540 may have a thickness which is suitable to prevent vibrations in the master holographic film 140. Preferably, the master film support 540 has a thickness of at least 10 mm, more preferably at least 15 mm, and even more preferably at least 20 mm.

During replication, a reactive light 132 may be applied to the photopolymer film 120 in the laminated glazing 410 through the master holographic film 140. The master film support 540 may be positioned between the reactive light source 130 and the master holographic film 140 during replication such that the reactive light 132 may pass through the master film support 540. Preferably, the reactive light 132 may have a wavelength in the range of 200 nm to 780 nm, more preferably in the range of 300 nm to 700 nm, and even more preferably in the range of 380 nm to 680 nm. It may be preferable that the master film support 540 has a transparency at the wavelength of the reactive light 132 of at least 70%, more preferably at least 80%, and even more preferably at least 90%.

Figure 10:
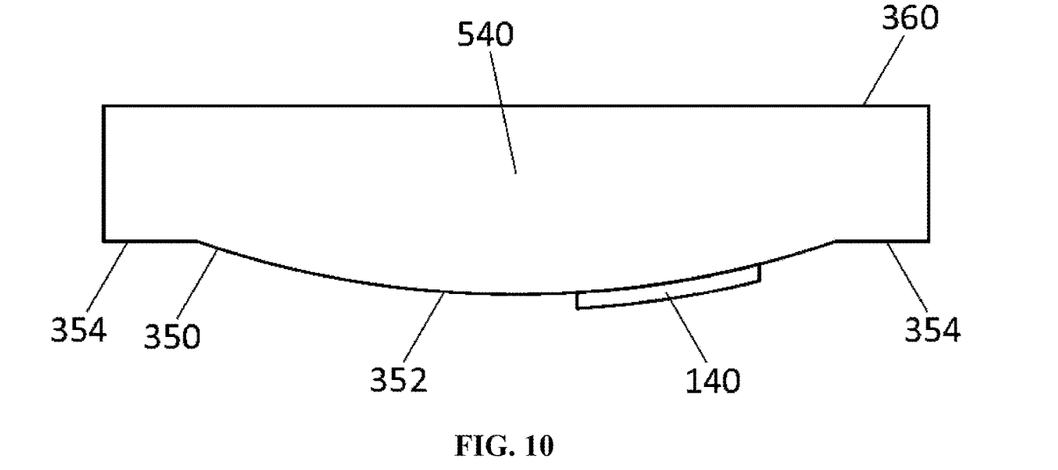
FIG. 10 illustrates a master holographic film construction, according to an exemplary embodiment of the present disclosure.
Figure 11:
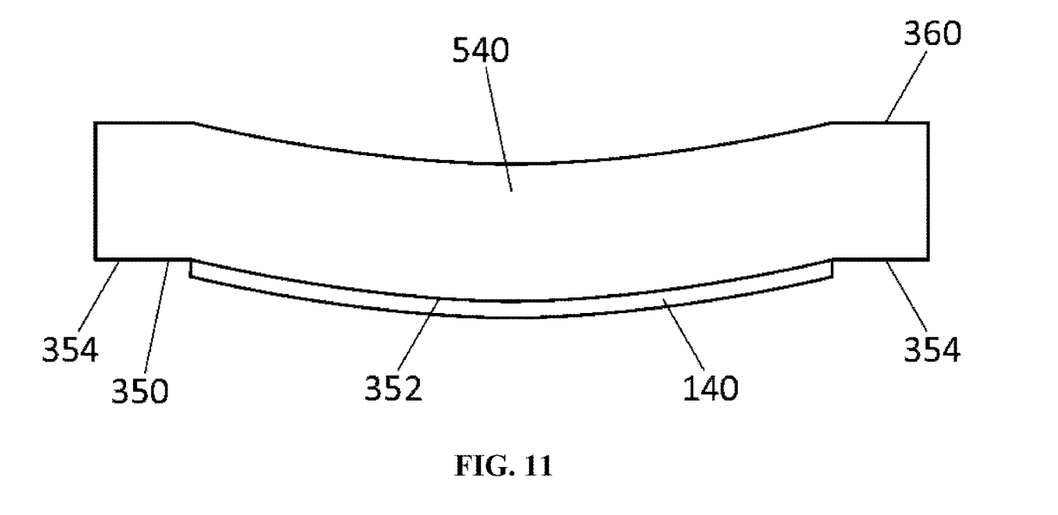
FIG. 11 illustrates a master holographic film construction, according to an exemplary embodiment of the present disclosure.
Figure 12:
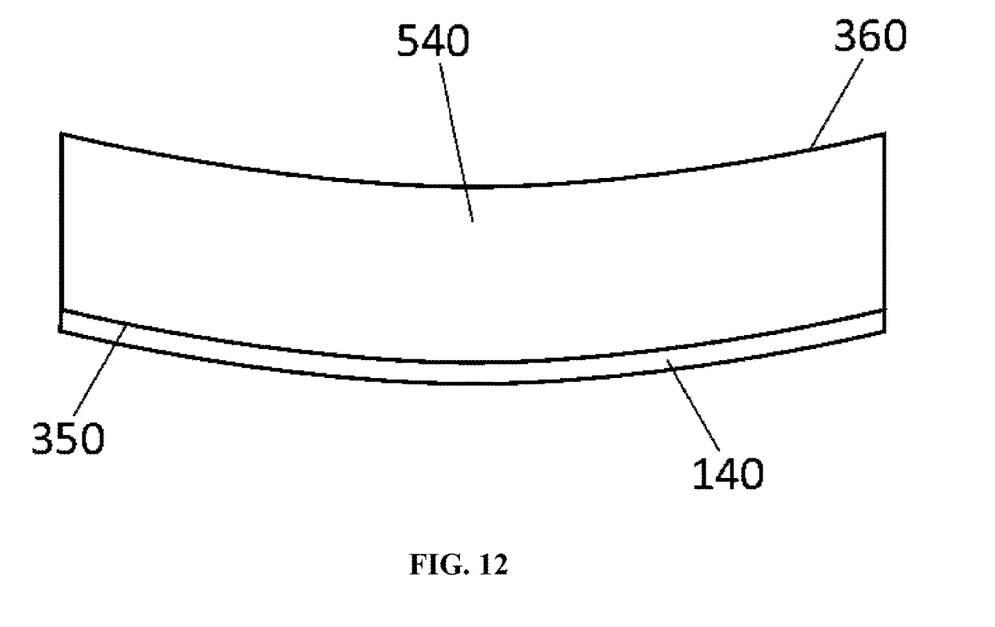
FIG. 12 illustrates a master holographic film construction, according to an exemplary embodiment of the present disclosure.
Figure 13:
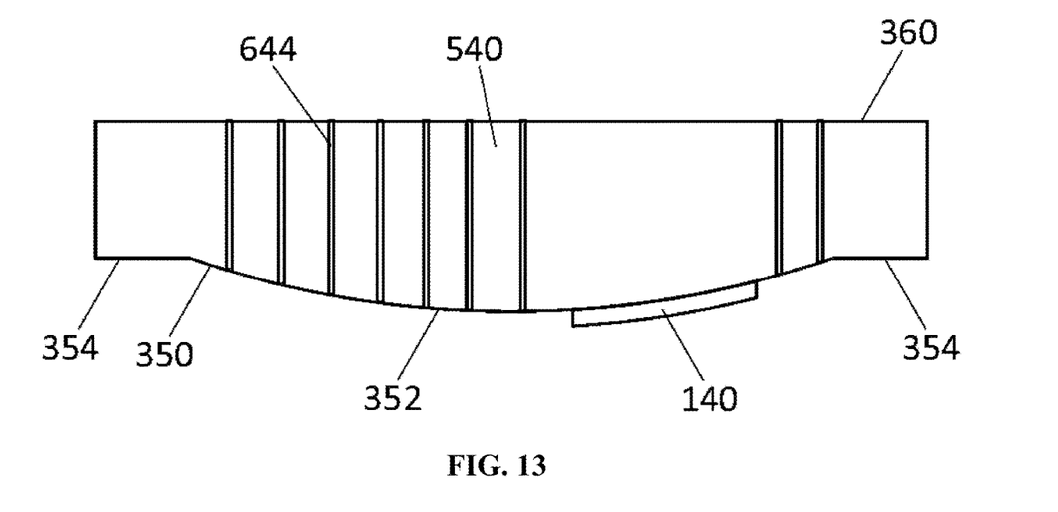
FIG. 13 illustrates a master holographic film construction, according to an exemplary embodiment of the present disclosure.

In certain embodiments, as illustrated in FIGS. 10 through 13, it may be preferable that the master film support 540 have a molded surface 350 to which the master holographic film 140 may be laminated. Preferably, the master holographic film 140 may have the same shape as the molded surface 350. Further, the molded surface 350 may have the same shape as the laminated glazing 410. For example, where the laminated glazing 410 is a windshield, the molded surface 350 may have a curved shape matching that of the windshield. Where replication is completed by applying light through the interior facing surface of a windshield, the molded surface 350 may have a convex shape. The master holographic film 140 may be the same size, as shown in FIG. 12, or smaller than the molded surface 350, as shown in FIGS. 10, 11, and 13. In certain embodiments, the master film 140 may have an area not more than 50%, preferably 25%, or more preferably 10% of the area of the molded surface 350. Where a laminated glazing 410 is a windshield, the master holographic film 140 may at least be in an area of the molded surface 350 which aligns with a HUD region in the windshield.

In certain embodiments, the molded surface 350 may at least one portion with a finite curvature. During replication, it may be preferable for the master film support 540 to be attached or placed on a housing, which may provide stability during replication. Particularly, in some embodiments, the curved portion 352 of the molded surface 350 may be sandwiched between non-curved portions 354 which may be placed on a housing element, as shown in FIGS. 10, 11, and 13. Further, the curved portion of the molded surface 350 may have more than one finite curvature value and may include a complex curvature. In certain embodiments, the portion of the molded surface 350 which is curved may be the same size and shape as the laminated glazing. FIG. 12 illustrates a master film support 540 wherein the entire molded surface 350 has a finite curvature and a master film 140 which extends across the entire master film support 540.

As shown in FIGS. 8 and 9, the master film support 540 may have an outer surface 360 opposite the master film 140 which may be the same (FIG. 9) or a different (FIG. 8) shape than the master film 140 and the molded surface 350. In some embodiments, it may be preferable that the outer surface 360 have a shape which complements the area of the molded surface having a finite curvature 352. For example, where the molded surface 350 has a convex shape, the outer surface 360 may have a concave shape having the same curvature as the molded surface curved surface 352, as shown in FIGS. 11 and 12.

In certain embodiments, an antireflective layer may be provided on the outer surface 360. During replication, light may reflect from the photopolymer film or the master holographic film. An antireflective layer on the outer surface 360 may prevent light from reflecting back to the films after it was reflected toward the outer surface 360.

In particular embodiments, the master holographic film 140 may be laminated to the master film support 540 such that a substrate layer of the master holographic film 140 is opposite the molded surface 350. The substrate layer of the master film 140 may be adjacent to a laminated glazing 410 at an interface 150 between the materials during replication.

Once the master holographic film 140 and reactive light 132 are used for replication, a bleaching light may have a wavelength different from the reactive light 132 may be applied to the photopolymer film 120. The master holographic film 140 may or may not remain over the laminated glazing 410 while the bleaching light is applied to the photopolymer film 120. After bleaching, the laminated photopolymer film 120 may no longer be reactive to light, including light in the wavelength of the reactive light 132.

Further, after replication, the master holographic film 140 and the laminated glazing 410 must be separated. It may be preferable in some embodiments to introduce air to the interface 150 between the master holographic film 140 and the laminated glazing 410 to ease the separation. A master film support 540 may include openings 644 extending from the outer surface 360 to the molded surface 350 through which air may be introduced to the interface 150 between the master film 140 and the laminated glazing 410. The openings 644 may not align with the holographic region of the master holographic film 140, such that no interruptions may be created in the master holographic film 140 by the openings 644. The openings 644 may be any suitable size, shape, and frequency to introduce air between the laminated glazing 410 and the master holographic film 140.

In the description above, for purposes of explanation and not limitation, the examples with specific details are set forth to provide a thorough understanding of the present disclosure. However, it will be apparent to those having ordinary skill in the art that other embodiments with various modifications and variations may be practiced without departing from the spirit and scope of the present disclosure.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A method of preparing a glazing, comprising the steps of:
   stacking a first glass sheet, a first interlayer, a photopolymer film, a second interlayer, and a second glass sheet to provide a lamination stack;
   deairing the lamination stack;
   autoclaving the lamination stack to provide a laminated glazing;
   applying a reactive light to the photopolymer film in the laminated glazing after deairing and autoclaving, wherein reactive light is applied to the laminated glazing through a master holographic film; and
   bleaching the laminated glazing such that the photopolymer film is no longer reactive to light exposure,
   wherein a master holographic film construction comprises a support having a molded surface to which the master holographic film is laminated, an outer surface which is flat, and a plurality of openings extending from the outer surface to the molded surface, wherein the molded surface has at least one portion comprising a finite curvature,
   wherein the master holographic film has an area smaller than the at least one portion comprising the finite curvature, and wherein the plurality of openings is provided outside of the area of the master holographic film laminated to the molded surface.

2. The method according to claim 1, wherein the lamination stack is deaired in a vacuum bag.

3. The method according to claim 2, wherein the lamination stack remains in the vacuum bag during autoclaving.

4. The method according to claim 1, wherein the reactive light has a wavelength in a range of from 200 to 780 nm.

5. The method according to claim 1, wherein the reactive light is applied to the photopolymer film through the second glass sheet and the second interlayer.

6. The method according to claim 5, wherein the first glass sheet has a lower visible light transmission than the second glass sheet.

7. The method according to claim 5, wherein the second interlayer excludes additives which absorb light in a wavelength of the reactive light and wherein the first interlayer includes light absorbing additives which absorb light in at least one of the wavelength of the reactive light and a wavelength of a bleaching light used for bleaching the laminated glazing.

8. The method according to claim 1, wherein the laminated glazing further comprises an infrared reflective layer.

9. The method according to claim 1, wherein an interface is formed between the laminated glazing and the master holographic film, wherein the interface comprises a space between the master holographic film and the laminated glazing.

10. The method according to claim 9, wherein a vacuum pressure is applied to the space between the master holographic film and the laminated glazing.

11. The method according to claim 9, wherein the space between the master holographic film and the laminated glazing is filled with a filling material, wherein the filling material has an index of refraction substantially the same as an index of refraction of a glass sheet of the laminated glazing.

12. The method according to claim 9, further comprising applying air to the interface through the openings in the support.

13. The method according to claim 9, wherein the master holographic film comprises a substrate layer, a photopolymer layer, and a cover layer.

14. The method according to claim 13, wherein the holographic film covers 50% or less of the molded surface.

15. The method according to claim 1, wherein a distance between the laminated glazing and the master holographic film in a head-up display region of the laminated glazing has a maximum rate of change of 1.0 mm over 100 mm.

16. The method according to claim 1, further comprising a first antireflective layer on the laminated glazing and a second antireflective layer on the master holographic film, wherein the first antireflective layer and the second antireflective layer face each other at an interface between the master holographic film and the laminated glazing.

17. The method according to claim 1, wherein the reactive light is applied at an angle of from about 80° to about 100° relative to the plane of the laminated glazing surface.

18. The method according to claim 13, further comprising an antireflective layer on the outer surface of the support, wherein the outer surface of the support is opposite the molded surface.

* * * * *